US010198656B2

(12) United States Patent
Fer et al.

(10) Patent No.: US 10,198,656 B2
(45) Date of Patent: Feb. 5, 2019

(54) DETERMINATION OF A DEGREE OF HOMOGENEITY IN IMAGES

(71) Applicant: Smiths Heimann SAS, Vitry sur Seine (FR)

(72) Inventors: Jean-Olivier Fer, Vitry sur Seine (FR); Youssef Kacer, Vitry sur Seine (FR); Najib Gadi, Vitry sur Seine (FR)

(73) Assignee: SMITHS HEIMANN SAS, Vitry-Sur-Seine (FR)

( * ) Notice: Subject to any disclaimer, the term of this patent is extended or adjusted under 35 U.S.C. 154(b) by 0 days.

(21) Appl. No.: 15/509,354

(22) PCT Filed: Sep. 9, 2015

(86) PCT No.: PCT/GB2015/052606
§ 371 (c)(1),
(2) Date: Mar. 7, 2017

(87) PCT Pub. No.: WO2016/038364
PCT Pub. Date: Mar. 17, 2016

(65) Prior Publication Data
US 2017/0249530 A1      Aug. 31, 2017

(30) Foreign Application Priority Data

Sep. 10, 2014    (GB) .................................. 1416039.4

(51) Int. Cl.
*G06K 9/46*        (2006.01)
*G06T 7/00*        (2017.01)
(Continued)

(52) U.S. Cl.
CPC ............. *G06K 9/4604* (2013.01); *G06K 9/50* (2013.01); *G06K 9/6267* (2013.01);
(Continued)

(58) Field of Classification Search
CPC ....... G06K 9/4604; G06K 9/50; G06K 9/6267
See application file for complete search history.

(56) References Cited

U.S. PATENT DOCUMENTS 4,845,558 A      7/1989   Tsai et al.
2012/0093289 A1  4/2012   Arodzero et al.

OTHER PUBLICATIONS

Honda, Toshifumi et al., "Finding 'Anomalies' in an Arbitrary Image", Proceeding of the Eighth IEEE International Conference on Computer Vision, (ICCV), Vancouver, British Columbia, Canada, Jul. 7-14, 2001, (International Conference on Computer Vision), Los Alamitos, CA, IEEE Comp, Soc, US, vol. 2, Jul. 7, 2001, pp. 516-523, XP010554132.
(Continued)

*Primary Examiner* — Siamak Harandi
(74) *Attorney, Agent, or Firm* — Kevin E. West; Advent, LLP

(57) ABSTRACT

In one embodiment, the disclosure relates to a method for determining a degree of homogeneity in one or more inspection images of cargo in one or more containers, comprising: determining whether a zone of interest in one or more processed inspection images comprises one or more patterns, wherein the one or more processed inspection images are processed from one or more inspection images generated by an inspection system configured to inspect the one or more containers; and in the event that one or more patterns is determined and that a variation in the determined one or more patterns is identified, classifying the one or more inspection images as having a degree of homogeneity below a predetermined homogeneity threshold.

20 Claims, 11 Drawing Sheets

(51) Int. Cl.
*G06T 7/41* (2017.01)
*G06K 9/50* (2006.01)
*G06K 9/62* (2006.01)

(52) U.S. Cl.
CPC .............. *G06T 7/0004* (2013.01); *G06T 7/41* (2017.01); *G06T 2207/30108* (2013.01)

(56) References Cited

OTHER PUBLICATIONS

Zhang, Jian et al., "Joint Shape and Texture Based X-Ray Cargo Image Classification", 2014 IEEE Conference on Computer Vision and Pattern Recognition Workshops, IEEE, Jun. 23, 2014, pp. 266-273, XP032649720.

International Search Report and Written Opinion dated Feb. 2, 2016 for PCT/GB2015/052606.

UK Search Report dated Feb. 20, 2015 for GB Application No. GB1416039.4.

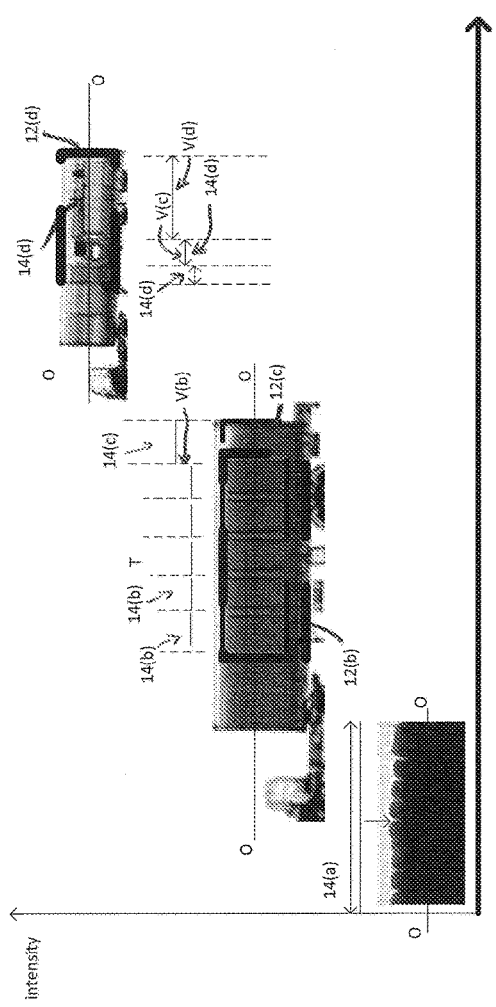
FIG. 10
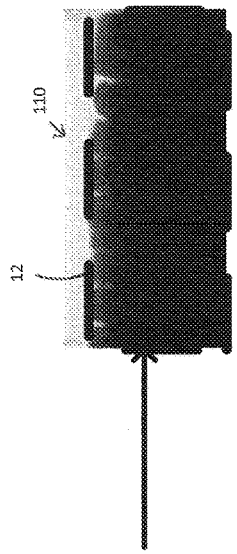
FIG. 11A
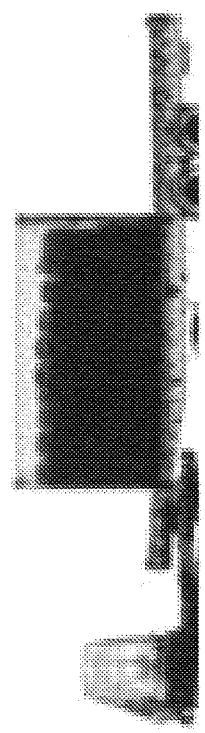

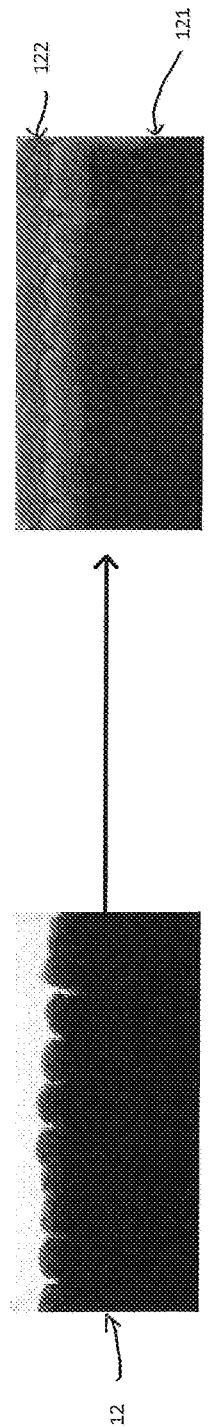
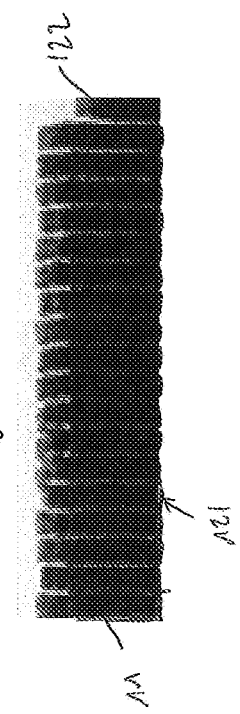
FIG. 11B
FIG. 11C

DETERMINATION OF A DEGREE OF HOMOGENEITY IN IMAGES

FIELD OF THE INVENTION

The present disclosure relates to methods and systems for determining a degree of homogeneity in images, and more particularly the present disclosure relates to methods and systems for determining a degree of homogeneity in inspection images.

BACKGROUND OF THE INVENTION

It may be difficult for a user to detect inhomogeneities in images, for example inspection images, particularly when the user has to visualize a great number of images. Also it may be difficult to detect inhomogeneities in images having a given level of contrast. These difficulties may represent a threat to security, as inhomogeneities in images may correspond to hidden objects, such as weapons or dangerous material.

PRESENTATION OF THE FIGURES

Embodiments of the disclosure will now be described, by way of example only, with reference to the accompanying drawings, in which:

FIG. 10 is a diagrammatic view that illustrates a determination of patterns, and an identification of a variation, in accordance with the present disclosure; and FIG. 11A-11C are diagrammatic views that illustrate examples of processing of images in accordance with the present disclosure.

In the Figures like reference numerals are used to indicate like elements.

DESCRIPTION OF EXAMPLE EMBODIMENTS

Overview

Figure 1:
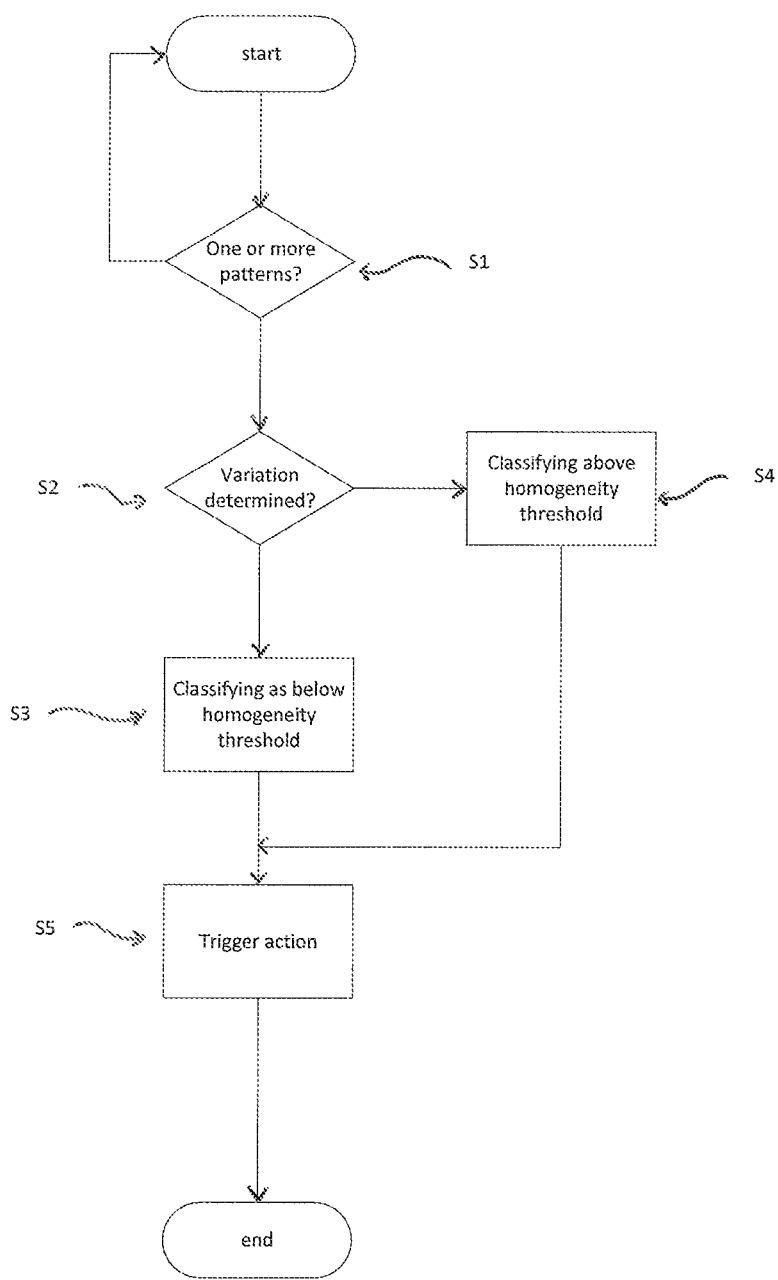
FIG. 1 is a flowchart that illustrates an example method in accordance with the present disclosure.

Embodiments of the disclosure relate to a method for determining a degree of homogeneity in images of cargo in containers. In embodiments, the degree of homogeneity is determined in connection with variations in one or more patterns determined in an image. In some embodiments, the determination of the degree of homogeneity may enable a classification of the image into categories, in connection with a homogeneity threshold. In embodiments, there may be a plurality of degrees of homogeneities. In embodiments, there may be more than two categories of images. The determination and/or the classification may enable to trigger an action, such as a detection of inhomogeneities in the image. The determination and/or the classification may be advantageous for detecting non-homogeneities in an otherwise homogeneous cargo. The determination and/or the classification may thus be advantageous for identifying oddities and/or inconsistencies in an otherwise consistent cargo. In embodiments, the method is performed on a plurality of levels of contrast in the images, such that, even if the image seems fully homogenous in a given level of contrast, an inhomogeneity may be detected in another level of contrast of the image. The determination and/or the classification by embodiments of the disclosure may enable making a decision about a chosen category of images, such as a classification as suspect or not suspect. The determination and/or the classification by embodiments of the disclosure may enable to assist a user to visualize a chosen category of images amongst a great number of images. Embodiments of the disclosure may enhance security, as the determination and/or the classification may enable detection of hidden objects, such as weapons or dangerous material.

Detailed Description of Example Embodiments

In one aspect of the present disclosure, there is described a method for determining a degree of homogeneity in one or more inspection images of cargo in one or more containers, comprising:

determining whether a zone of interest in one or more processed inspection images comprises one or more patterns, wherein the one or more processed inspection images are processed from one or more inspection images generated by an inspection system configured to inspect the one or more containers; and in the event that one or more patterns is determined and that a variation in the determined one or more patterns is identified, classifying the one or more inspection images as having a degree of homogeneity below a predetermined homogeneity threshold.

In embodiments, the method may further comprise, in the event that a plurality of patterns is determined: extracting one or more regions in the zone of interest, determining whether the extracted one or more regions comprises at least two identical regions, and in the event that no identical regions is determined, classifying the one or more inspection images as having a degree of homogeneity below at least one predetermined inhomogeneity threshold.

In embodiments, the predetermined inhomogeneity threshold may be equal to the predetermined homogeneity threshold. The predetermined homogeneity threshold may be strictly greater than the predetermined inhomogeneity threshold.

In embodiments, in the event that at least two identical regions is determined and that a variation is identified, the classifying may further comprise: classifying the one or more inspection images as having an intermediate degree of homogeneity comprised above the predetermined inhomogeneity threshold and below the predetermined homogeneity threshold.

In embodiments, the one or more inspection images may be processed to obtain one or more processed inspection images with a plurality of levels of contrast, the method may further comprise: repeating the determining of the degree of homogeneity for a plurality of levels of contrast, based on the classifying. The repeating may be performed for a sequence of levels of contrast in the plurality of levels of contrast as long as the classifying comprises classifying the one or more inspection images as having a degree of homogeneity above the predetermined homogeneity threshold. The method may further comprise: stopping the repeating when the classifying comprises classifying the one or more inspection images as having a degree of homogeneity below the predetermined homogeneity threshold.

In embodiments, the repeating may be performed for a sequence of levels of contrast in the plurality of levels of contrast as long as the classifying comprises classifying the one or more inspection images as having a degree of homogeneity above the predetermined inhomogeneity threshold. The method may further comprise: stopping the repeating when the classifying comprises classifying the one or more inspection images as having a degree of homogeneity below the predetermined inhomogeneity threshold.

In embodiments, the method may further comprise triggering an action based on the classifying, wherein the action is chosen from the group consisting of: displaying one or more inspection images; not displaying one or more inspection images; issuing an alarm to a user; determining a composition of a part of the cargo in one or more inspection images; sending one or more inspection images to a controller; outputting a command to a controller; any combination of the foregoing.

In embodiments, the method may further comprise receiving a selection of the zone of interest selected by a user and/or by a controller.

In embodiments, the method may further comprise receiving a selection of an axis crossing the zone of interest, and the one or more patterns may be defined and the variation may be identified along the selected axis. In embodiments, the selected axis may correspond to a direction of loading of the cargo in the one or more containers.

In embodiments, the determining whether the zone of interest comprises one or more patterns may comprise: performing an analysis in at least a part of the zone of interest; and determining whether the analysed part comprises one or more patterns.

In embodiments, the performed analysis may comprise a frequency analysis.

In embodiments, the method may comprise identifying a plurality of patterns when a plurality of periodic patterns can be identified along the selected axis.

In embodiments, the extracting of the one or more regions in the zone of interest may comprise: extracting each region by creating a block having a dimension, along the selected axis, corresponding to substantially a period of the identified periodic patterns.

In embodiments, the determining whether the extracted one or more regions comprises at least two identical regions may comprise: performing a block matching on the created blocks; and determining a difference between the blocks using one or more classifiers. The one or more classifiers may be chosen from the group consisting of: a support vector machine, SVM, k-nearest neighbours, k-NN, any combination of the foregoing.

In embodiments, the performed analysis may comprise a segmentation of the analysed part.

The segmentation may be performed by a watershed algorithm. The method may comprise identifying a single continuous pattern in the event that the segmented analysed part comprises only one region. The method may comprise: identifying a continuous pattern along the selected axis.

In embodiments, the processing of the inspection images may comprise: identification of the cargo in the inspection images; separation of a zone corresponding to the cargo from a zone corresponding to a container; discarding a part of an inspection image; any combination of the foregoing. The processing may be performed prior to the determining.

In embodiments, inspection may be performed by transmission of inspection radiation from an inspection radiation source to an inspection radiation detector through the one or more containers.

In another aspect of the present disclosure, there is described an analyser for determining a degree of homogeneity in one or more inspection images of cargo in one or more containers, configured to:

determine whether a zone of interest in one or more processed inspection images comprises one or more patterns, wherein the one or more processed inspection images are processed from one or more inspection images generated by an inspection system configured to inspect the one or more containers; and in the event that one or more patterns is determined and that a variation in the determined one or more patterns is identified, classify the one or more inspection images as having a degree of homogeneity below a predetermined homogeneity threshold.

In another aspect of the present disclosure, there is described an apparatus comprising: an inspection system configured to inspect a container and an analyser according to any aspect of the disclosure.

In another aspect of the present disclosure, there is described a computer program product comprising program instructions to program a processor to carry out data processing of a method according to any aspect of the disclosure, or to program a processor to provide an analyser of any aspect of the disclosure, or to provide an apparatus of any one aspect of the disclosure.

Figure 4:
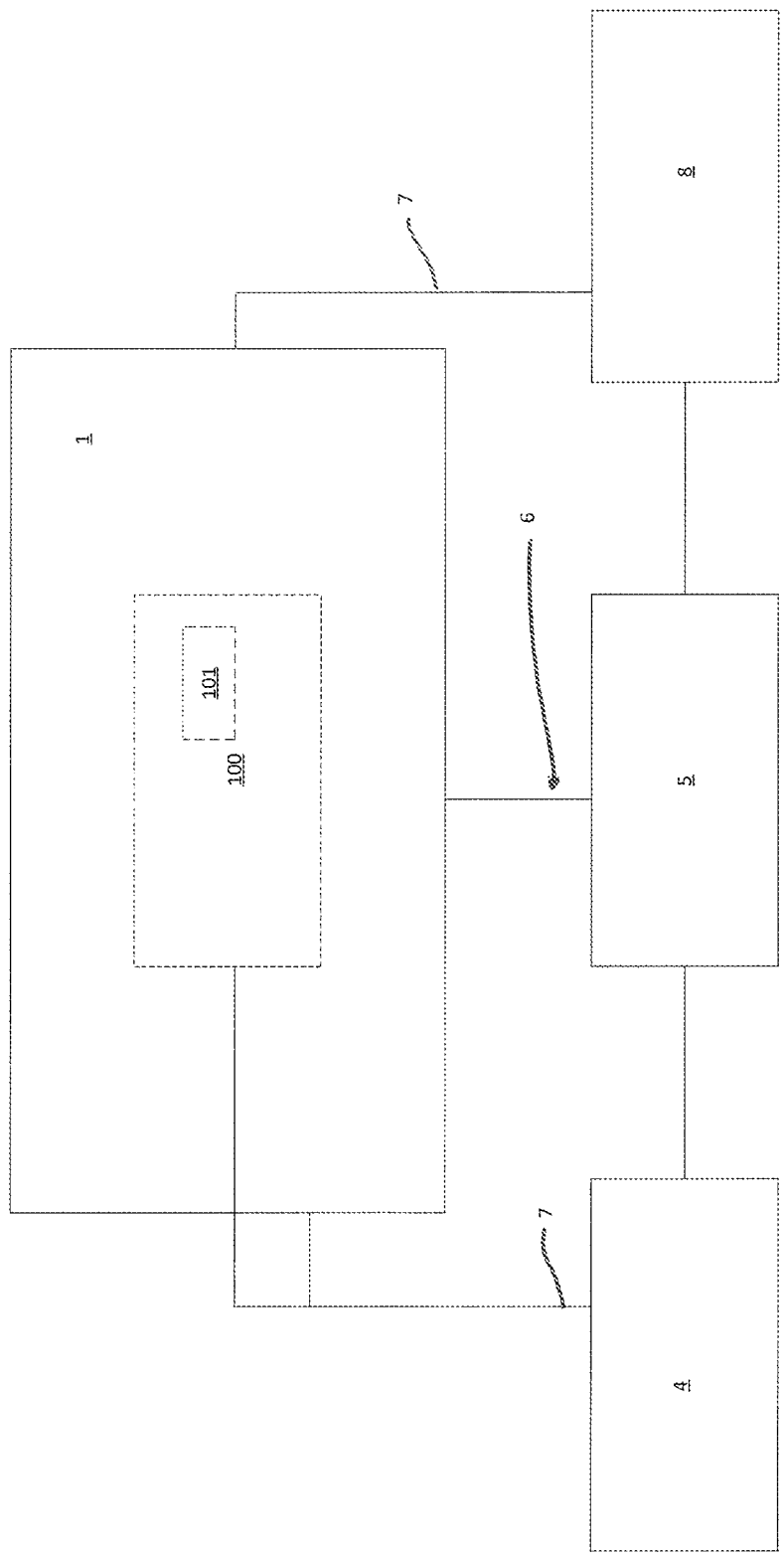
FIG. 4 is a diagrammatic view that illustrates an example apparatus in accordance with the present disclosure.

FIG. 4 illustrates an apparatus comprising an analyser 5 configured to classify one or more inspection images 10 of cargo 101 in one or more containers 100.

Each of the images 10 may be generated by an inspection system 1.

In the examples illustrated by the Figures, each image 10 corresponds to a container 100 inspected by the system 1. In some examples, the number of images 10 and/or containers 100 acquired and/or inspected by the system 1 by unit of time defines a throughput of the system 1.

As will be apparent in more detail below, the analyser 5 may be configured to receive the one or more images 10 from the system 1, for example over a communication network 6 which may be wired and/or may be wireless. The analyser 5 conventionally comprises at least a processor and a memory in order to carry out an example method according to the disclosure.

In embodiments, the one or more inspection images 10 are processed so that processed inspection images 110 are generated, for example by the system 1 and/or the analyser 5 and/or a controller 4 (described in more detail below). In some embodiments, the processing may generate processed inspection images 10 which may be digital or digitized.

As explained in further detail below in relation to FIGS. 5 and 6, the inspection system 1 is configured to inspect the container 100. In some non-limiting examples, the inspection may be performed by transmission of inspection radiation 3 from an inspection radiation source 31 to an inspection radiation detector 32 through the container 100. Alternatively or additionally, the radiation 3 may be transmitted through the container 100 (the material of the container 100 being thus transparent to the radiation), while the radiation may, at least partly, be reflected by the load 101 located in the container 100 (the material and/or composition of the load located in the container 100 being thus only partly transparent to the radiation 3, and partly reflective to the radiation 3—in that case, detectors may be placed to receive the radiation reflected by the load 101).

Figure 5:
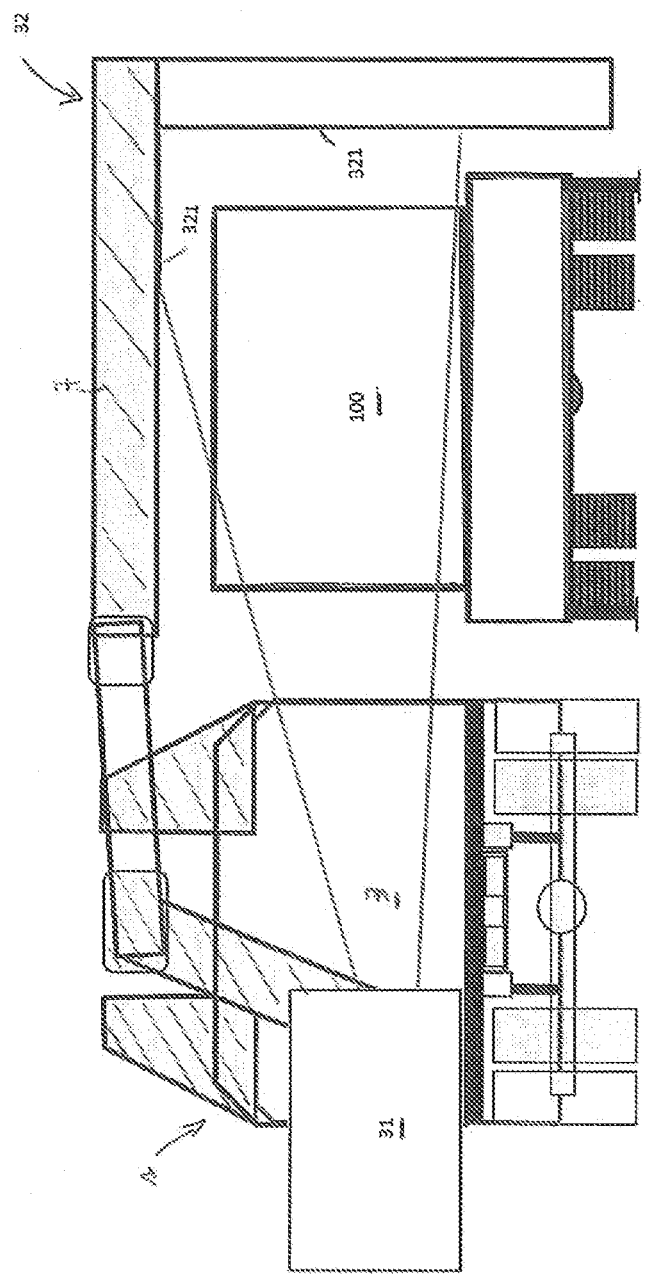
FIG. 5 is a rear view that illustrates an example of a mobile inspection system in accordance with the present disclosure, in an inspection mode.
Figure 6:
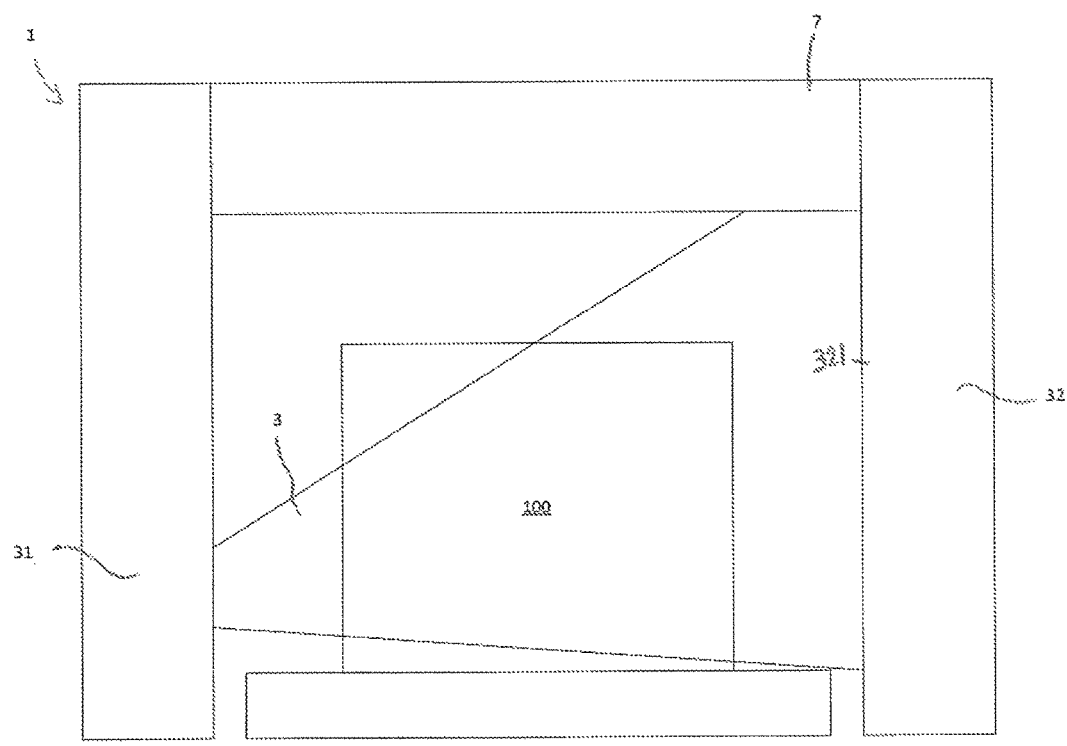
FIG. 6 is a rear view that illustrates an example of a static inspection system in accordance with the present disclosure, in an inspection mode.

FIGS. 5 and 6 illustrate that the container 100 may be any type of container, such as a holder, a vessel, or a box, etc. The container 100 may thus be, as non-limiting examples, a trailer and/or a palette (for example a palette of European standard, of US standard or of any other standard) and/or a train wagon and/or a tank and/or a boot of a vehicle such as a truck, a van and/or a car and/or a train, and/or the container 100 may be a "shipping container" (such as a tank or an ISO container or a non-ISO container or a Unit Load Device (ULD) container). It is thus appreciated that the container 100 may be any type of container, and thus may be a suitcase in some examples. The radiation source 31 is configured to cause inspection of the cargo 101 through the material (usually steel) of walls of the container 100, e.g. for detection and/or identification of the cargo 101.

The system 1 is configured to, in the inspection mode, cause inspection of the container 100, in totality (i.e. the whole container 100 is inspected) or partially (i.e. only a chosen part of the container is inspected, e.g., typically, when inspecting a vehicle, a cabin of the vehicle may not be inspected, whereas a rear part of the vehicle is inspected).

In the example illustrated by FIG. 5, the inspection system 1 may be mobile and may be transported from a location to another location (the system 1 may comprise an automotive vehicle), and in the example illustrated by FIG. 6, the inspection system 1 may be static with respect to the ground and cannot be displaced.

In the examples illustrated by the Figures, the inspection radiation source 31 comprises an X-ray generator. The energy of the X-rays may be comprised between 100 keV and 15 MeV, and the dose may be comprised between 2 mGy and 20 Gy (Gray). In the example illustrated by FIG. 5, the power of the X-ray source 31 may be e.g., between 100 keV and 9.0 MeV, typically e.g., 2 MeV, 3.5 MeV, 4 MeV, or 6 MeV, for a steel penetration capacity e.g., between 40 mm to 400 mm, typically e.g., 300 mm (12 in). In the example illustrated by FIG. 5, the dose may be e.g., between 20 mGy and 120 mGy. In the example illustrated by FIG. 6, the power of the X-ray source 31 may be e.g., between 4 MeV and MeV, typically e.g., 9 MeV, for a steel penetration capacity e.g., between 300 mm to 450 mm, typically e.g., 410 mm (16.1 in). In the example illustrated by FIG. 6, the dose may be 17 Gy.

In the examples illustrated by the Figures, the inspection radiation detector 32 comprises, amongst other conventional electrical elements, radiation detection lines 321, such as X-ray detection lines. The inspection radiation detector 32 may further comprise other types of detectors, such as optional gamma and/or neutrons detectors, e.g., adapted to detect the presence of radioactive gamma and/or neutrons emitting materials within the container 100, e.g., simultaneously to the X-ray inspection. In the example illustrated in FIG. 5, the inspection radiation detector 32 may also comprise an electro-hydraulic boom 7 which can operate in a retracted position in a transport mode (not illustrated in the Figures) and in an inspection position (FIG. 5). The boom 7 may be operated by hydraulic activators (such as hydraulic cylinders). In the example illustrated in FIG. 6, the inspection radiation detector 32 may also comprise a structure and/or gantry 7. The detection lines 321 may be mounted on the boom 7 (FIG. 5) or structure and/or gantry 7 (FIG. 6), facing the source 31 on the other side of the container 100.

In order to inspect the container 100, in the example illustrated by FIG. 5, the system 1 may comprise a motion generation device so that the system 1 may be displaced, the container 100 being static (this mode is sometimes referred to as a 'scanning' mode). Alternatively or additionally, the motion generation device may cause the container 100 to be displaced, the system 1 being static with respect to the ground (FIG. 6). In some embodiments, the throughput, i.e. the number of containers 100 and/or images 10 by unit of time, may be of 20 to 30 images/hour. Alternatively or additionally, in a 'pass-through' mode the system 1 does not comprise a motion generation device and the container moves with respect to the system 1, the system 1 being static with respect to the ground. In embodiments, the throughput in the pass-through mode may be higher than the throughput in the scanning mode, and may be for example of 50 to 200 images/hour, or even of 50 to a few thousands images/hour in the case of an inspection of a passing train (for example a throughput of more than 1000 images/hour).

In the example illustrated by FIG. 4, the apparatus may further comprise the controller 4, configured to communicate, via a communication network 7, with the system 1 and/or the container 100 and/or the analyser 5. The controller 4 conventionally comprises at least a processor and a memory in order to carry out an example method according to the disclosure.

In the example illustrated by FIG. 4, the apparatus may further comprise a communication server 8, configured to communicate, via the communication network 7, with the system 1 and/or the analyser 5. In some examples, the communication server 8 may be configured to provide a remote data management system. In some examples the server 8 may comprise a database.

The example method illustrated by FIG. 1 may comprise, at S1, determining whether a zone 12 of interest in a processed inspection image 110 comprises one or more patterns 14.

Figure 7:
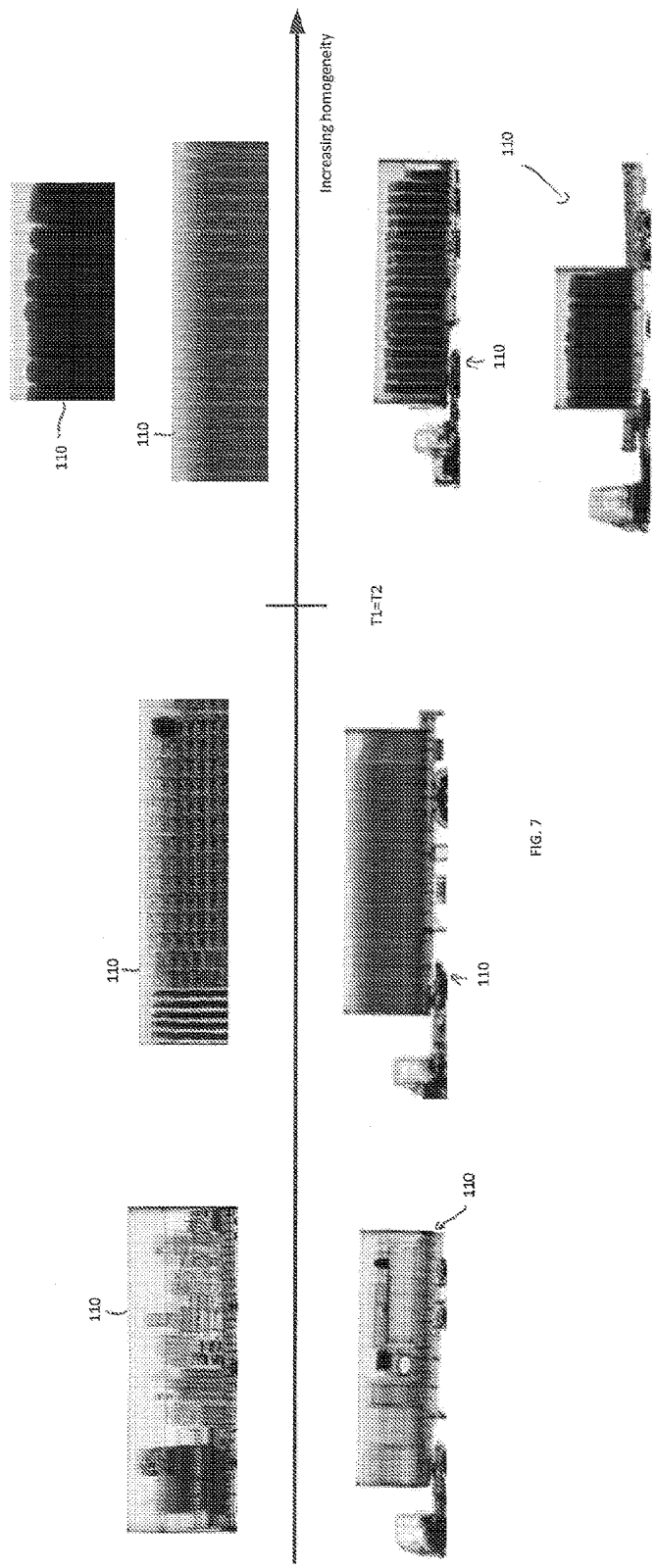
FIG. 7 is a diagrammatic view that illustrates an example of a classifying of images in accordance with the present disclosure, on an axis of increasing homogeneity, with two categories.

Examples of processed inspection images 110 are illustrated by FIG. 7.

In some embodiments, the zone of interest 12 is selected by a user of the system 1, for example using an interface of the system 1, and/or by the controller 4 or by the analyser 5, for example automatically. The selection may then be received, for example by the analyser 5. The selection of the zone 12 may enable the analyser 5 (and thus the user) to focus their analysis on a part only of the image 110. It is understood that in some examples the zone of interest may correspond to the whole image 110.

Figure 9:
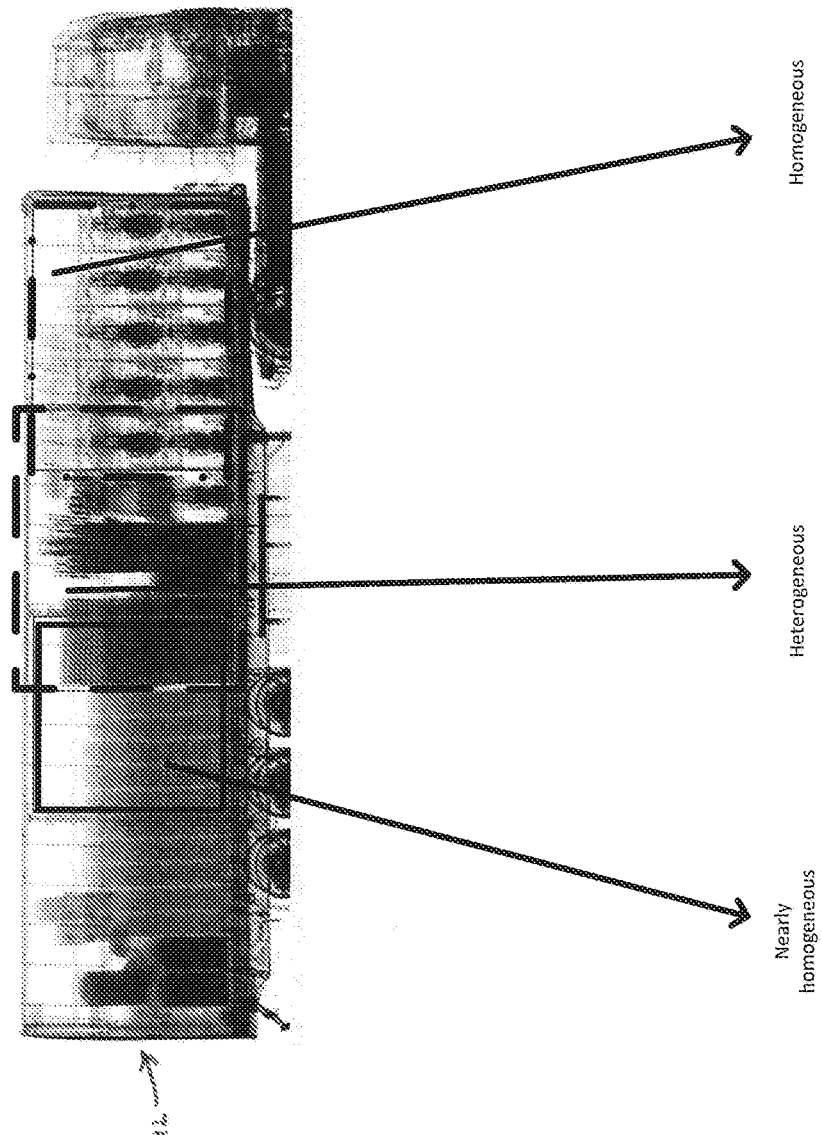
FIG. 9 is a diagrammatic view that illustrates an example of a classifying of zones of interest in an image, with three categories.

As illustrated in the example of FIG. 9, the classification of the image 110 may depend on the zone 12 of interest. As can be seen on the example of FIG. 9, for a same image 110, the zone 12 of interest on the right-hand side may be classified as heterogeneous, the zone 12 of interest on the left-hand side may be classified as nearly homogeneous, and the zone 12 of interest in the zone on the left-hand side may be classified as homogeneous.

As illustrated in FIG. 10, a pattern 14 in an image 110 may be a recognizable shape, intensity or texture having a macroscopic visual property, such as a defining a recognizable item or composition in the image 110. Examples of patterns 14 include geometrical shapes and levels of contrasts.

As described in further detail below, the pattern 14 may be extracted by the analyser from values of pixels (such as a level of grey) of the image 110 and/or from spatial mutual relationships between the pixels of the image 110 corresponding to the structure of the image 110.

As illustrated by the example of FIG. 10, the pattern 14 may be continuous (see pattern 14(*a*) with a uniform intensity over its whole extension), periodic or quasi-periodic (see pattern 14(*b*) in the zone of interest 12(*b*)), or may have a random repetition in intensity and extension (see individual patterns 14(*d*)).

It is understood that the pattern 14 may be determined at any location in the image 110 or in the zone 12.

In some examples, an axis (O-O) crossing the zone 12 of interest may be selected.

In some examples, the axis (O-O) may be selected either by the user of the system 1, and/or automatically by the controller 4 or the analyser 5. The analyser 5 then receives the selection of the selected axis (O-O).

In embodiments, the one or more patterns 14 may thus be preferably defined along the selected axis (O-O). In some examples, it may be advantageous that the selected axis (O-O) corresponds to a direction of loading of the cargo in the one or more containers 100, as this enhances the determination of the patterns 14. In the example of FIG. 10, the selected axis (O-O) is in the horizontal direction, as the loading of the illustrated trailer of a truck is performed in the horizontal direction, and a pattern, such as a periodic pattern, may thus be defined along the horizontal direction. It is understood that another direction may be selected for the selected axis (O-O), such as a vertical direction, for example when items are stacked on top of each other in the vertical direction. Other directions may also be envisaged.

In the example illustrated by FIG. 1, in the event that one or more patterns 14 is determined at S1, it is determined at S2 whether a variation V is identified or not in the determined one or more patterns 14.

As described in further detail below and as illustrated by FIG. 10, the variation V may be identified by the analyser 5 from values of pixels (such as values of levels of grey) of the image 110.

In the example embodiment illustrated by FIG. 10, the variation V may be identified when there is a change in the intensity (for example the variation V(b) between pattern 14(*b*) and new pattern 14(*c*) in zone 12(*c*)) and/or in the extension and/or in the period of the pattern (for example the variation V(c) between the two patterns 14(*d*) in zone 12(*d*)).

In some embodiments, the variation V may be identified along the selected axis (O-O).

In the event that a variation V is identified at S2 in the determined one or more patterns 14, the example method illustrated by FIG. 1 may comprise classifying, at S3, the inspection image 10 as having a degree of homogeneity below a predetermined homogeneity threshold, for example referred to as T1 in FIG. 7, for example on an axis X describing increasing homogeneity. The image 10 below T1 is thus classified as non-homogeneous.

In the event that no variation is identified at S2 in the determined one or more patterns 14, the example method illustrated by FIG. 1 may comprise classifying, at S4, the inspection image 10 as having a degree of homogeneity above the predetermined homogeneity threshold T1. The image 10 above T1 is thus classified as homogeneous.

It is understood that the level of the threshold T1 on the axis X may vary in relation to the level of the variation V required for the variation V to be detected by the analyser 5. The threshold T1 may be positioned high on the axis X if even a small level of variation V is detected by the analyser 5 and generates a classification below the threshold T1. In that example, the category above the threshold T1 may comprise only the highly homogeneous images 10 (as shown in FIG. 7), and as soon as a small variation V is detected in a pattern in an image, the corresponding image may be classified below the threshold T1, and therefore classified as non-homogeneous (and in some examples classified as therefore potentially suspect by the analyser 5).

On the contrary, the threshold T1 may be positioned low on the axis X if a relatively high level of variation V needs to be detected by the analyser 5 to generate a classification below the threshold T1, i.e. as non-homogeneous. In that example, the category above the threshold T1 may thus comprise the homogeneous and nearly homogeneous images 10. In that example only the heterogeneous images may be classified as non-homogeneous (and in some examples classified as therefore potentially suspect by the analyser 5).

It is thus understood that determining the level of variation V necessary for the classification, by positioning the threshold T1, may determine the threshold at which the image 10 may be treated as suspect or not suspect by the analyser 5. It is therefore understood that the method may be advantageous in that it may provide an automatic ranking of the inspection images 10, the ranking being performed with respect to the threshold T1. The method is advantageous in that it may provide an automatic decision on the images by the analyser 5. This is advantageous as it may enable to assist the user of the system 1, who will thus be able to only focus on and/or inspect a chosen category of images. In some examples, the user of the system 1 may be able to focus on and/or inspect the images in the one or more categories below T1, for example when a homogeneous cargo is expected, or focus on and/or inspect the images in the category above T1, for example when a heterogeneous cargo is expected. The user may not need to visualize and/or inspect the images to make a decision whether the image is suspect or not.

Figure 2:
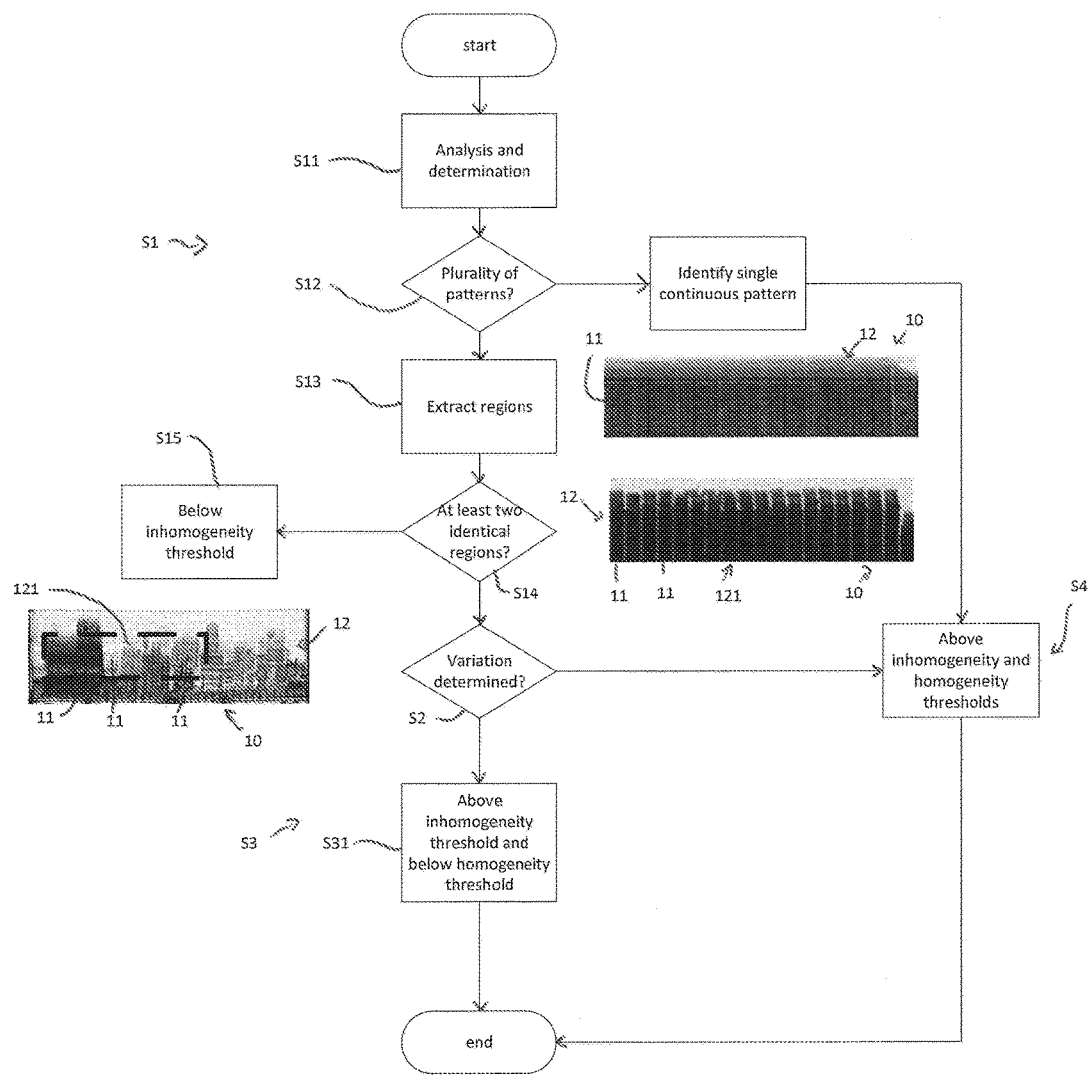
FIG. 2 is a flowchart that illustrates a detail of an example method in accordance with the present disclosure.

In the examples illustrated by FIG. 2, the determining at S1 whether the zone 12 comprises one or more patterns 14 comprises, at S11, performing an analysis in at least a part 121 of the zone 12 of interest, and determining whether the analysed part 121 comprises one or more patterns 14. As described in further detail below (for example in relation to FIG. 11C), the part 121 may correspond to a selection in the zone 12, for example generated by a processing of the zone 12, for example to discard zones which would for example disturb the analysis. It is understood that in some examples the part 121 may be the whole zone 12.

If it is determined, at S12, that a plurality of patterns is determined at S11, the method proceeds to S13.

At S13, one or more regions 11 in the zone 12 of interest may be extracted.

At S14, it may be determined whether the extracted one or more regions 11 comprises at least two identical regions 11.

In the example method illustrated by FIG. 2, in the event that a plurality of patterns 14 is determined at S1, and in the event that no identical regions is determined at S14, the inspection image 10 is classified, at S15, as having a degree of homogeneity below a predetermined inhomogeneity threshold, for example referred to as T2 in FIG. 8, on the axis X describing increasing homogeneity.

Figure 8:
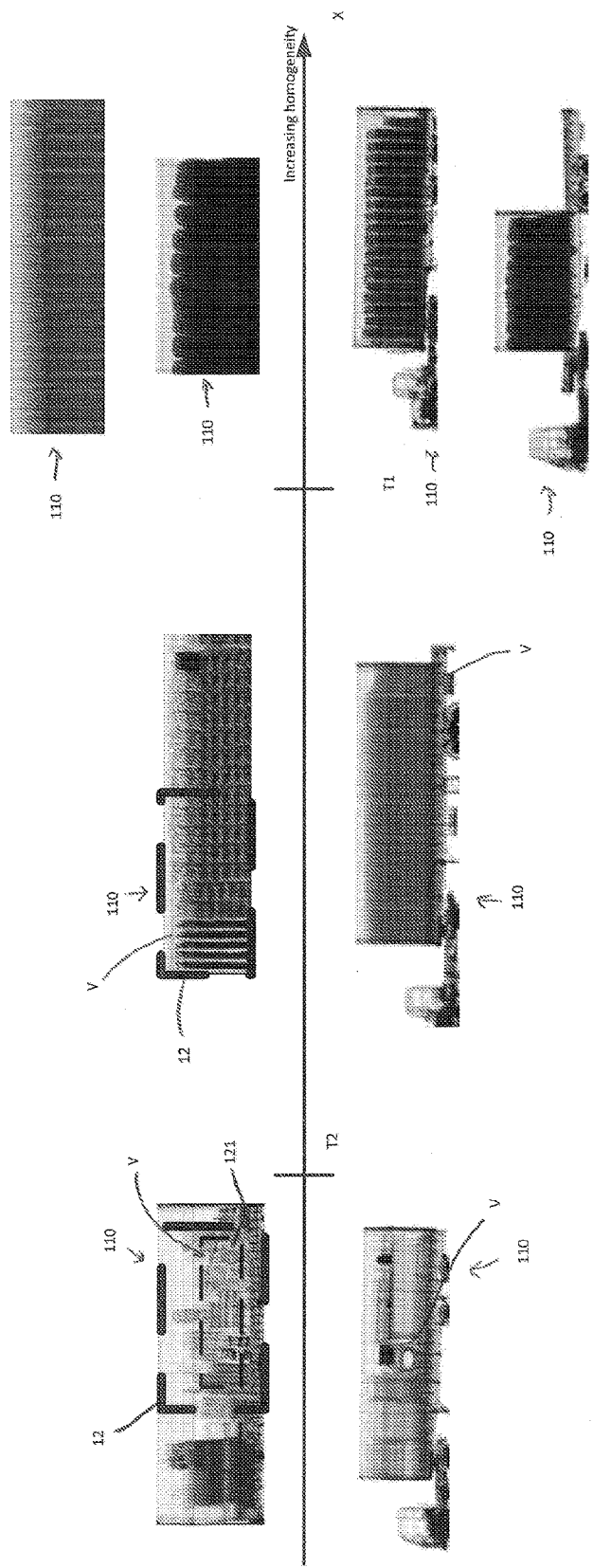
FIG. 8 is a diagrammatic view that illustrates an example of a classifying of images in accordance with the present disclosure, on an axis of increasing homogeneity, with three categories.

In the example illustrated in FIG. 8, the predetermined homogeneity threshold T1 is strictly greater than the predetermined inhomogeneity threshold T2 on the axis X describing increasing homogeneity. The images 10 classified below T2 are for example classified as heterogeneous by the analyser 5.

In the example method illustrated by FIG. 2, in the event that a plurality of patterns 14 is determined at S1, and in the event that at least two identical regions is determined at S14, it is determined at S2 whether a variation V is identified or not in the determined one or more patterns 14.

As it may be the case in the example illustrated in FIG. 1, in the example of FIG. 2, in the event that a variation V is identified at S2 in the determined one or more patterns 14, the example method may comprise classifying, at S3, the inspection image 10 as having a degree of homogeneity below the predetermined homogeneity threshold T1 in FIG. 8. However in the example method illustrated by FIG. 2, in the event that at least two identical regions is determined at S14 and that a variation V is identified at S2, the classifying at S3 further comprises classifying, at S31, the image 10 as having an intermediate degree of homogeneity above the predetermined inhomogeneity threshold T2 and below the predetermined homogeneity threshold T1 on the axis X describing increasing homogeneity. The image 10 is thus for example classified as non-homogeneous (below T1), but it is not classified as heterogeneous (above T2) by the analyser 5.

In the event that no variation is identified at S2 in the determined one or more patterns 14, the example method illustrated by FIG. 2 may comprise classifying, at S4, the inspection image 10 as having a degree of homogeneity above the predetermined homogeneity threshold T1. The image 10 is thus for example classified as homogeneous by the analyser 5.

In the examples illustrated in FIGS. 8 and 9, there are at least three categories of images 10, that is:
a category corresponding for example to a heterogeneous load or cargo, for example below the predetermined inhomogeneity threshold T2 on the axis X;
a category corresponding to a homogeneous load or cargo, for example above the predetermined homogeneity threshold T1 on the axis X; and
a category corresponding to a quasi-homogeneous (sometimes referred to as "nearly homogeneous") load or cargo, for examples above the predetermined inhomogeneity threshold T2 and below predetermined homogeneity threshold T1 on the axis X.

In some examples, an image 10 may thus be classified by the analyser 5 in the category corresponding to the heterogeneous load when a significant part of the load in the zone 12 of interest is heterogeneous, for example when a significant part of the load comprises e.g., heterogeneous bulk material or components different from each other.

In some examples, an image 10 may thus be classified by the analyser 5 in the category corresponding to the homogeneous load for example when the entire cargo in the zone 12 of interest is homogeneous, e.g. when the load comprises only one type of cargo, such as apples or beans, a fluid, a given material, etc.

In some examples, an image 10 may thus be classified in the category corresponding to the quasi-homogeneous load by the analyser 5 when the whole cargo in the zone 12 is almost homogeneous but there is a variation such as a rupture in the patterns or a small area very different compared to the adjacent areas, e.g. the container is full of apples in the zone 12 and one bowling ball is among the apples. The category corresponding to a quasi-homogeneous cargo corresponds thus to an intermediate degree of homogeneity.

It is understood that in the example illustrated in FIG. 7, the predetermined inhomogeneity threshold T2 is equal to the predetermined homogeneity threshold T1, and there are only two categories, such as homogeneous and non-homogeneous. It is also understood that there may be more than three categories corresponding to more than three degrees of homogeneity with more than two thresholds.

In the example method illustrated by FIG. 1, the method further comprises triggering, at S5, an action based on the classifying.

In some examples, the inspection images 10 may be displayed to a user on an interface of the analyser 5. The action may be displaying one or more inspection images, for example displaying the images 10 classified as heterogeneous or quasi-homogeneous. Alternatively or additionally, the displaying may be displaying only the images 10 classified as heterogeneous or only the images 10 classified quasi-homogeneous.

Alternatively or additionally, the action may be not displaying one or more inspection images, for example not displaying the images 10 classified as homogeneous. This example embodiment may be advantageous in a case where the user has to inspect a great number of inspection images, such as a tens or hundreds of images an hour, for example in the case of inspection of trailers of trucks or wagons of a passing train, but the user does not want to inspect in detail a given category of images, such as the images classified as homogeneous.

Alternatively or additionally, the action may be issuing an alarm to the user, for example issuing a visual or aural alarm when images 10 are classified as heterogeneous or quasi-homogeneous. In some examples, a zone of inhomogeneity or non-homogeneity may be highlighted on the image 10.

Alternatively or additionally, the action may be determining a composition of a part of the cargo in one or more inspection images 10, for example automatically determining a composition of a heterogeneous part of the otherwise homogeneous cargo.

Alternatively or additionally, the action may be sending one or more inspection images to the controller 4, for example sending the images 10 classified as heterogeneous or quasi-homogeneous for further processing.

Alternatively or additionally, the action may be outputting a command to the controller 4, for example stopping the motion generation device which causes the corresponding container 100 to be displaced, or for example opening the corresponding container 100 for further inspection by the user.

It will be understood that the action may enable the user to focus only on the images 10 which were for example classified or ranked as suspect images by the analyser 5.

In some embodiments, the inspection image 10 may be processed to obtain one or more processed inspection images 110 with a plurality of levels of contrast.

The determining at S1 of the degree of homogeneity may thus be repeated for a plurality of levels of contrast, based on the classifying. In some examples, the repeating is performed for a sequence of levels of contrast in the plurality of levels of contrast, as long as the classifying comprises classifying the one or more inspection images as having a degree of homogeneity above the predetermined homogeneity threshold T1 or the predetermined inhomogeneity threshold T2. It is understood that this example embodiment takes into account that it is not because the image appears to be homogeneous or quasi-homogeneous for a level of contrast that it will be homogeneous in all the levels of contrast.

In some embodiments, the repeating is stopped when the classifying comprises classifying the one or more inspection images as having a degree of homogeneity below the predetermined homogeneity threshold T1 or below the predetermined inhomogeneity threshold T2.

Figure 3:
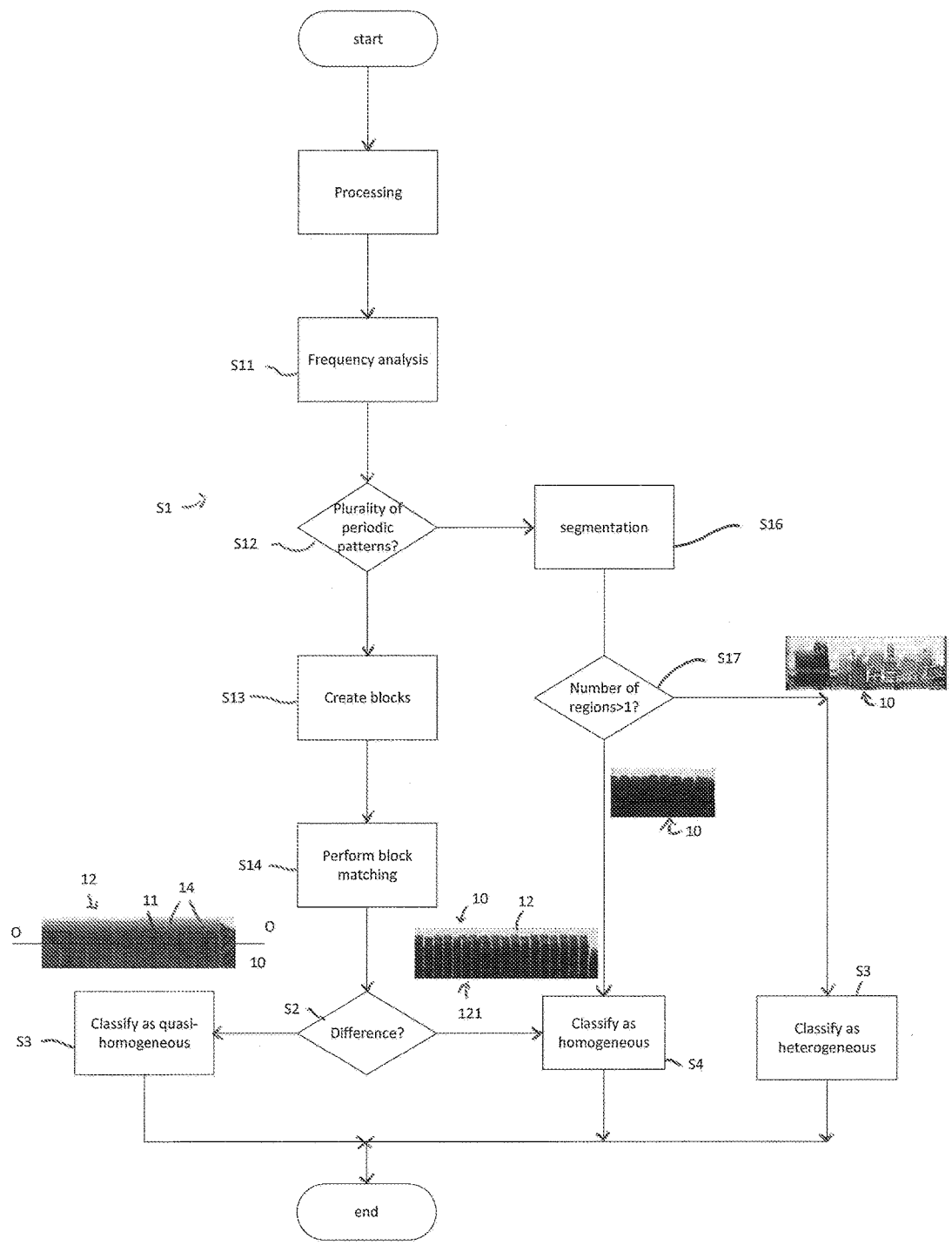
FIG. 3 is a flowchart that illustrates a detail of an example method in accordance with the present disclosure.

In the example illustrated in FIG. 3, the determining performed at S1 whether the zone 12 of interest comprises one or more patterns comprises:

performing an analysis in at least a part of the zone of interest; and determining whether the analysed part comprises one or more patterns.

In the example illustrated in FIG. 3, the selected axis (O-O) is a horizontal axis.

In the example illustrated in FIG. 3, the performed analysis comprises a frequency analysis performed at S11, such as a Fourier analysis of the part of the zone 12 of interest.

It is then determined at S12 if a plurality of periodic patterns 14 can be identified along the selected axis (O-O).

If it is determined at S12 that a plurality of periodic patterns 14 can be identified along the selected axis (O-O), then the method proceeds to S13 where the extracting of the regions 11 in the zone 12 of interest comprises extracting each region 11 by creating a block having a dimension, along the selected axis (O-O), corresponding to substantially a period T of the identified periodic patterns 14.

As explained below, this example embodiment may enable comparison of the regions 11 without the disturbing effect of the separation between the periodic patterns 14.

At S14, the determining whether the extracted regions 11 comprises at least two identical regions comprises performing a block matching on the created blocks 11.

At S2, it is determined if there is a difference between the blocks 11, using one or more classifiers.

In some embodiments, the classifier may be a support vector machine, SVM, or a k-nearest neighbours, k-NN.

In some examples, the SVM algorithm may be based on a learning algorithm (Machine Learning Algorithm) that uses training bases. In some examples, the training bases may comprise an existing 2-class SVM database (such as homogeneous or quasi-homogeneous). In some examples the database may comprise mathematical attributes (for example a 3-size vector feature, but it is understood that other attributes may be extracted) extracted from existing cargo images (preferably a large quantity of cargo images) manually tagged, for example as homogeneous or quasi-homogeneous, by a user or an operator of the system 1 during an initialization step. For example, the database may be based on 42 images tagged as "homogeneous" and 62 images tagged as "nearly homogeneous".

For example, in the example of FIG. 3, At S2, the mathematical attributes (for example the 3-size vector feature) may be extracted from the image to be classified, and the SVM classifier of the analyser 5 determines whether there is a difference between the blocks 11 using the two "homogeneous" or "quasi-homogeneous" training bases. In some examples the SVM database may be stored in the server 8.

If it is determined at S2 that there is a difference between the blocks 11, then the method proceeds to S3 where the image is classified as quasi-homogeneous.

If it is determined at S2 that there is no difference between the blocks 11, then the method proceeds to S4 where the image is classified as homogeneous.

If it is determined at S12 that a plurality of periodic patterns cannot be identified along the selected axis (O-O), then the method proceeds to S16, where the performed analysis comprises a segmentation of the analysed part.

In some non-limiting examples, the segmentation is performed by a watershed algorithm.

It is then determined, at S17, whether the segmented analysed part comprises more than one region.

In the event that the segmented analysed part comprises only one region, the image is classified as homogeneous at S4, as S4 corresponds to identifying a single continuous pattern 14, for example along the selected axis (O-O).

In the event that the segmented analysed part comprises more than one region, the image is classified as heterogeneous at S3.

In the example illustrated in FIG. 11A, the processing of the inspection images 10 may comprise identification of the cargo in the inspection images. The identification of the cargo may be advantageous in assisting in the selection of the zone 12 from a full or a truncated image of a container 100.

In the example illustrated in FIG. 11B, the processing of the inspection images 10 may comprise separation of a zone 121 corresponding to the cargo from a zone 122 corresponding to a container 100.

In the example illustrated in FIG. 11C, the processing of the inspection images 10 may comprise discarding a part 122 of an inspection image 10. In the example of FIG. 11C, the processing may include for example discarding a part of the cargo which would lead to an inaccurate analysis. In the example of FIG. 11C, the processing may include for example discarding the last column on the right-hand side, as the last column may be interpreted as a variation whereas it is only a difference in height in the stacks. Alternatively or additionally, discarding may enable discarding a part of the container 100 which could be wrongly considered as part of the cargo by the analyser 5.

Alternatively or additionally, the processing may thus enable discarding a part 122 of the image corresponding to:
  a refrigerating part of an ISO refrigerating container,
  a part of a non-ISO container,
  a part of a particular container (such as a tank);
  a part of a chassis of e.g., a truck or a trailer.

In some embodiments, the processing is performed prior to the determining of S1.

The method and apparatus of the disclosure may be combined with other existing user-assisted features/tools of the system 1 and/or the analyser 5, and other existing automatic software, for example to detect suspicious items.

Other variations and modifications of the system or the analyser will be apparent to the skilled in the art in the context of the present disclosure, and various features described above may have advantages with or without other features described above.

For example, the analyser 5 may, at least partly, form a part of the inspection system 1. For example, the server 8 and/or the controller 4 may, at least partly, form a part of the analyser 5.

In the above embodiments, the patterns 14 and the variation V are determined or identified in an image. It is understood that in some embodiments the patterns could be identified in a plurality of images, and that the variation could be identified in a plurality of images compared to each other (such as the images each corresponding to a wagon of a train).

It is understood that the inspection radiation source may comprise sources of other radiation, such as, as non-limiting examples, sources of ionizing radiation, for example gamma rays or neutrons.

The inspection radiation source may also comprise sources which are not adapted to be activated by a power supply, such as radioactive sources, such as using Co60 or Cs137.

As one possibility, there is provided a computer program, computer program product, or computer readable medium, comprising computer program instructions to cause a programmable computer to carry out any one or more of the methods described herein. In example implementations, at least some portions of the activities related to the analyser 5 and/or the communications networks 6 and/or 7 herein may be implemented in software. It is appreciated that software components of the present disclosure may, if desired, be implemented in ROM (read only memory) form. The software components may, generally, be implemented in hardware, if desired, using conventional techniques.

In some examples, components of the analyser 5 and/or the communications networks 6 and/or 7 may use specialized applications and hardware.

As will be apparent to the skilled in the art, the server 8 and/or the controller 4 should not be understood as a single entity, but rather refers to a physical and/or virtual device comprising at least a processor and a memory, the memory may be comprised in one or more servers which can be located in a single location or can be remote from each other to form a distributed network (such as "server farms", e.g., using wired or wireless technology).

In some examples, one or more memory elements (e.g., the database and/or the memory of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The communications network 6 and the communications network 7 may form only one network.

The data received by the analyser 5 may be typically received over a range of possible communications networks 6 and/or 7 at least such as: a satellite based communications network; a cable based communications network; a telephony based communications network; a mobile-telephony based communications network; an Internet Protocol (IP) communications network; and/or a computer based communications network.

In some examples, the communications networks 6 and/or 7 and/or the analyser 5 may comprise one or more networks.

Networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for determining a degree of homogeneity in one or more inspection images, comprising:
    transmitting, via an inspection system, inspection radiation from an inspection radiation source to an inspection detector through one or more containers containing cargo, the inspection system configured to inspect the one or more containers to obtain one or more inspection images;
    processing the one or more inspection images generated by the inspection system;
    determining whether a zone of interest in the one or more processed inspection images comprises one or more patterns; and
    in the event that one or more patterns is determined and that a variation in the determined one or more patterns is identified, classifying the one or more inspection images as having a degree of homogeneity below a predetermined homogeneity threshold; and
    based at least in part of the classification, alerting a user to inspect cargo in the one or more containers corresponding to the one or more inspection images.

2. The method of claim 1, further comprising:
    extracting one or more regions in the zone of interest based on a determination that the zone of interest comprises a plurality of patterns,
    determining whether the extracted one or more regions comprises at least two identical regions, and
    in the event that no identical regions is determined, classifying the one or more inspection images as having a degree of homogeneity below at least one predetermined inhomogeneity threshold.

3. The method of claim 2, wherein the predetermined inhomogeneity threshold is equal to the predetermined homogeneity threshold.

4. The method of claim 2, wherein the predetermined homogeneity threshold is strictly greater than the predetermined inhomogeneity threshold.

5. The method of claim 2, wherein, in the event that at least two identical regions are determined and that a variation is identified, the classifying further comprises:
    classifying the one or more inspection images as having an intermediate degree of homogeneity comprised above the predetermined inhomogeneity threshold and below the predetermined homogeneity threshold.

6. The method of claim 1, the method further comprising:
processing the one or more inspection images to obtain one or more processed inspection images with a plurality of levels of contrast; and
repeating the determining of the degree of homogeneity for the plurality of levels of contrast, based on the classifying.

7. The method of claim 6, wherein the repeating is performed for a sequence of levels of contrast in the plurality of levels of contrast as long as the classifying comprises classifying the one or more inspection images as having a degree of homogeneity above the predetermined homogeneity threshold.

8. The method of claim 6, further comprising:
extracting one or more regions in the zone of interest based on a determination that the zone of interest comprises a plurality of patterns,
determining whether the extracted one or more regions comprises at least two identical regions, and
in the event that no identical regions is determined, classifying the one or more inspection images as having a degree of homogeneity below at least one predetermined inhomogeneity threshold, wherein the repeating is performed for a sequence of levels of contrast in the plurality of levels of contrast as long as the classifying comprises classifying the one or more inspection images as having a degree of homogeneity above the predetermined inhomogeneity threshold.

9. The method of claim 8, further comprising:
stopping the repeating when the classifying comprises classifying the one or more inspection images as having a degree of homogeneity below the predetermined inhomogeneity threshold.

10. The method of claim 1, further comprising triggering an action based on the classifying, wherein the action is chosen from the group consisting of:
displaying one or more inspection images;
not displaying one or more inspection images;
issuing an alarm to a user;
determining a composition of a part of the cargo in one or more inspection images;
sending one or more inspection images to a controller;
outputting a command to a controller; or
any combination of the foregoing.

11. The method of claim 1, further comprising receiving a selection of the zone of interest selected by at least one of a user or a controller.

12. The method of claim 1, wherein the determining whether the zone of interest comprises one or more patterns comprises:
performing an analysis in at least a part of the zone of interest; and
determining whether the analysed part comprises one or more patterns.

13. The method of claim 12, further comprising receiving a selection of an axis crossing the zone of interest, wherein the one or more patterns are defined and the variation is identified along the selected axis; and identifying a plurality of patterns when a plurality of periodic patterns can be identified along the selected axis.

14. The method of claim 13, further comprising in the event that a plurality of patterns is determined:
extracting one or more regions in the zone of interest based on a determination that the zone of interest comprises a plurality of patterns,
determining whether the extracted one or more regions comprises at least two identical regions, and
in the event that no identical regions is determined, classifying the one or more inspection images as having a degree of homogeneity below at least one predetermined inhomogeneity threshold, and wherein the extracting of the one or more regions in the zone of interest comprises:
extracting each region by creating a block having a dimension, along the selected axis, corresponding to substantially a period of the identified periodic patterns.

15. The method of claim 14, wherein the determining whether the extracted one or more regions comprises at least two identical regions comprises:
performing a block matching on the created blocks; and
determining a difference between the blocks using one or more classifiers.

16. The method of claim 12, wherein the performed analysis comprises a segmentation of the analysed part.

17. The method of claim 1, wherein the processing of the inspection images comprises:
identification of a cargo in the inspection images;
separation of a zone corresponding to the cargo from a zone corresponding to a container;
discarding a part of an inspection image; or
any combination of the foregoing.

18. The method of claim 1, wherein inspection is performed by transmission of inspection radiation from an inspection radiation source to an inspection radiation detector through the one or more containers.

19. An analyser for determining a degree of homogeneity in one or more inspection images, the analyser comprising:
a memory configured to store at least one of code, data, or instructions; and
a processor coupled to the memory, the processor configured to execute the at least one of code, data, or instructions to cause the processor to:
transmit, via an inspection system, inspection radiation from an inspection radiation source to an inspection detector through one or more containers containing cargo, the inspection system configured to inspect the one or more containers to obtain one or more inspection images;
determine whether a zone of interest in one or more processed inspection images comprises one or more patterns, wherein the one or more processed inspection images are processed from the one or more inspection images;
in the event that one or more patterns is determined and that a variation in the determined one or more patterns is identified, classify the one or more inspection images as having a degree of homogeneity below a predetermined homogeneity threshold; and
based at least in part of the classification, alert a user to inspect cargo in the one or more containers corresponding to the one or more inspection images.

20. A system for determining a degree of homogeneity in one or more inspection images, the system comprising:
an inspection system configured to inspect one or more containers containing cargo and generate one or more inspection images;
at least one analyser in communication with the inspection system, the at least one analyser including:
a memory configured to store at least one of code, data, or instructions; and
a processor coupled to the memory, the processor configured to execute the at least one of code, data, or instructions to cause the processor to:

transmit, via the inspection system, inspection radiation from an inspection radiation source to an inspection detector through the one or more containers;
obtain the one or more inspection images from the inspection system;
process the one or more inspection to generate one or more processed inspection images;
determine whether a zone of interest in the one or more processed inspection images comprises one or more patterns;
in the event that one or more patterns is determined and that a variation in the determined one or more patterns is identified, classify the one or more inspection images as having a degree of homogeneity below a predetermined homogeneity threshold; and
based at least in part of the classification, alert a user to inspect cargo in the one or more containers corresponding to the one or more inspection images.

* * * * *